US006636014B1

(12) United States Patent
Payne

(10) Patent No.: US 6,636,014 B1
(45) Date of Patent: Oct. 21, 2003

(54) APPROACH FOR CHARGING TRAILERED BATTERY

(76) Inventor: James C. Payne, 244 County Rd. 42, Apple Valley, MN (US) 55124

( * ) Notice: Subject to any disclaimer, the term of this patent is extended or adjusted under 35 U.S.C. 154(b) by 7 days.

(21) Appl. No.: 10/045,636

(22) Filed: Oct. 26, 2001

Related U.S. Application Data

(60) Provisional application No. 60/243,048, filed on Oct. 26, 2000.

(51) Int. Cl.$^7$ ................................................. H02J 7/00
(52) U.S. Cl. ....................................................... 320/104
(58) Field of Search ................................. 320/104, 107; 307/10.1; 280/414.1

(56) References Cited

U.S. PATENT DOCUMENTS

| | | | | |
|---|---|---|---|---|
| 4,647,139 A | * | 3/1987 | Yang | 439/483 |
| 4,649,332 A | * | 3/1987 | Bell | 320/117 |
| 4,829,223 A | * | 5/1989 | Broberg et al. | 320/105 |
| 4,885,524 A | * | 12/1989 | Wilburn | 320/105 |
| 5,013,259 A | * | 5/1991 | Maurer | 439/522 |
| 5,583,414 A | * | 12/1996 | Lawrence | 320/107 |
| 6,166,516 A | * | 12/2000 | Albright et al. | 320/104 |

* cited by examiner

*Primary Examiner*—Gregory J. Toatley, Jr.

(57) ABSTRACT

According to an example embodiment of the present invention, an arrangement charges an equipment battery while the equipment is being towed by a towing vehicle. The towing vehicle has a primary battery and a rearward-located hitch for towing the trailer that carries the equipment battery. The arrangement includes three sets of electrical lines, each with terminals conveniently adapted for ease of use. A front set of main electrical lines includes terminals at one end thereof for electrically coupling to the anode and cathode of the primary battery and includes a main plug-in adapter at another end thereof. A rear set of rear electrical lines includes terminals at one end thereof for electrically coupling to the anode and cathode of the secondary battery and includes a trailered plug-in adapter at another end thereof. An intermediary set of interconnecting electrical lines includes a first plug-in adapter at one end thereof for plugging into the main plug-in adapter and electrically coupling to the primary battery and a second plug-in adapter at another end thereof for plugging into the trailered plug-in adapter and electrically coupling to the secondary battery. Also, line harnesses are included to secure the electrical lines during periods of towing. Other aspects of the invention involve in-line circuit breaking and power-on indicators.

26 Claims, 1 Drawing Sheet

APPROACH FOR CHARGING TRAILERED BATTERY

RELATED PATENT DOCUMENTS

This is a continuation of U.S. patent application Ser. No. 60/243,048, filed on Oct. 26, 2000, which is incorporated herein by reference and to which priority is claimed under 35 U.S.C. §120.

FIELD OF THE INVENTION

The present invention is directed to battery charging arrangements and, more specifically, to arrangements for supplying a charge from a towing vehicle battery to a battery for equipment being towed or trailered by the towing vehicle.

BACKGROUND

There have been previous approaches to charging batteries, including those mounted on a towed vehicle. Examples of such approaches are described in U.S. Pat. Nos. 4,647,139 (Yang), 4,649,332 (Bell), 4,829,223 (Broberg), 4,885,524 (Wilburn), 5,013,259 (Maurer), 5,583,414 (Lawrence), and 6,166,516 (Albright). One approach to remote-battery charging includes an electrical circuit having a diode connected in series with a resistor having a resistance value within the range of 200 to 235 ohms. These components are electrically connected in series between the charging source, which is typically the positive terminal of the battery of the towing vehicle, and the positive terminal of the battery on the towed vehicle which needs to be charged. At the beginning of charging operation, the towed vehicle battery is often relatively discharged and the current draw from the towed vehicle battery is relatively significant. After a period of time, as the diode passes the current, the towing vehicle electrical system charges the towed vehicle battery, and the current draw from the towed vehicle battery is reduced. The high-wattage resistor that is used to reduce the current generated in the charging circuit may be large enough to result in a hazardous condition (e.g., excess heat, possibly causing a fire), particularly when the towing vehicle battery and the towed vehicle battery are improperly connected in reverse polarity, which creates a 24-volt potential, or when the battery on the towed vehicle becomes internally short-circuited. Although use of a high-wattage current-limiting resistor protects against such a potentially hazardous condition, a major drawback of this system is that, by including a relatively high resistance in the circuit, the normal or typical charging current is so small that the towed battery receives very little charge, even over long periods of time; this reduction in charge is directly due to the resistance and associated voltage differential across the diode/resistor combination and, to a lesser extent, the inherent resistance of the cables used to interconnect the batteries. Depending upon these resistance values, the rate of charge can be relatively insubstantial and, for relatively short towing trips, unacceptable.

Other disadvantages with the above approaches involve manufacturing, installation and ease of use. Requiring both a resistor and a diode to implement the charging arrangement results in higher material costs during manufacturing, and increases the complexity of installation. Moreover, increasing the complexity of installation increases the risk of improper installation. Another related need is a way to encourage and remind the user to connect the trailered battery for charging; attempting to use the trailered equipment on site without a charged battery for the equipment can be very frustrating.

Accordingly, these and other design considerations have presented challenges to efforts to implement an approach to charging towed vehicle batteries that is relatively inexpensive and also capable of providing an adequately high charge rate.

SUMMARY

The present invention is directed to overcoming the above-mentioned challenges and others related to the types of devices and applications discussed above and in other memory cells. The present invention is exemplified in a number of implementations and applications, some of which are summarized below.

According to an example embodiment of the present invention, an arrangement charges an equipment battery while the equipment is being towed by a towing vehicle. The towing vehicle has a primary battery and a rearward-located hitch for towing the trailer that carries the equipment battery. The arrangement includes three sets of electrical lines, each with terminals conveniently adapted for ease of use. A front set of main electrical lines includes terminals at one end thereof for electrically coupling to the anode and cathode of the primary battery and includes a main plug-in adapter at another end thereof. A rear set of rear electrical lines includes terminals at one end thereof for electrically coupling to the anode and cathode of the secondary battery and includes a trailered plug-in adapter at another end thereof. An intermediary set of interconnecting electrical lines includes a first plug-in adapter at one end thereof for plugging into the main plug-in adapter and electrically coupling to the primary battery and a second plug-in adapter at another end thereof for plugging into the trailered plug-in adapter and electrically coupling to the secondary battery. Also, line harnesses are included to secure the electrical lines during periods of towing.

In other example embodiments a circuit breaker and/or a power-on indicator are provided in-line.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
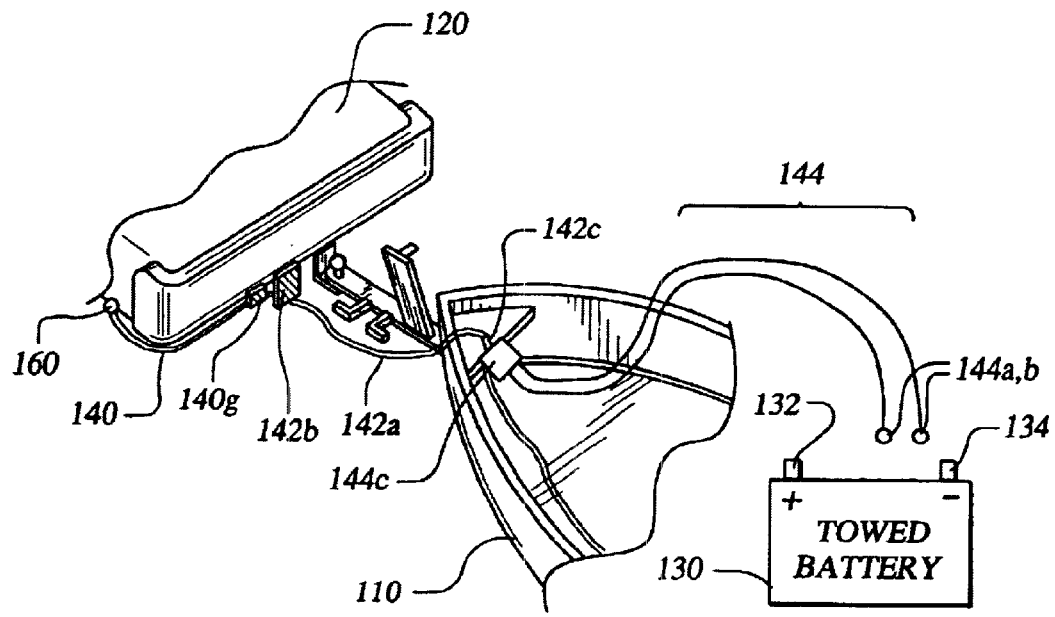
FIG. 1 is illustration of a system for charging a trailered battery, according to an example embodiment of the present invention.

While the invention is amenable to various modifications and alternative forms, specifics thereof have been shown by way of example in the drawing and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of applications, and has been found to be particularly useful for charging batteries of trailered equipment, such as boats, other water-craft, ATVs, snowmobiles and battery-run construction equipment. While the present invention is not necessarily limited to such applications, various aspects of the invention may be appreciated through a discussion of various examples using this context.

According to a first example embodiment, the present invention is implemented to charge an equipment battery while the equipment is being towed by a towing vehicle. The towing vehicle has a primary battery and a rearward-located hitch for towing the trailer that carries the equipment battery. The arrangement includes three sets of electrical lines, each with terminals conveniently adapted for ease of use. A front set of main electrical lines includes terminals at one end thereof for electrically coupling to the anode and cathode of the primary battery and includes a main plug-in adapter at another end thereof. A rear set of rear electrical lines includes terminals at one end thereof for electrically coupling to the anode and cathode of the secondary battery and includes a trailered plug-in adapter at another end thereof. An intermediary set of interconnecting electrical lines includes a first plug-in adapter at one end thereof for plugging into the main plug-in adapter and electrically coupling to the primary battery and a second plug-in adapter at another end thereof for plugging into the trailered plug-in adapter and electrically coupling to the secondary battery.

According to another more specific example embodiment of the present invention, the above arrangement is enhanced by including a viewable indicator adapted to indicate electrical connection to the primary battery. In one implementation, the viewable indicator is within the casing of the main plug-in adapter and is electrically connected to the main lines which, in turn, connect to the primary battery. In another implementation, the viewable indicator is outside the casing of the main plug-in adapter and is electrically coupled to the main lines elsewhere, for example inside or outside the casing of the plug-in adapter of either the intermediary set or rear set of lines. The viewable indicator can be implemented, for example, using an LED (light-emitting diode).

According to another more specific example embodiment of the present invention, power shut-off is provided to the first example embodiment by including a manually-engageable resettable circuit breaker in-line with the power lead of the main set of lines. With the power lead connecting to the anode of the primary battery, problems due to a short or improper hook-up are mitigated.

Figure 2:
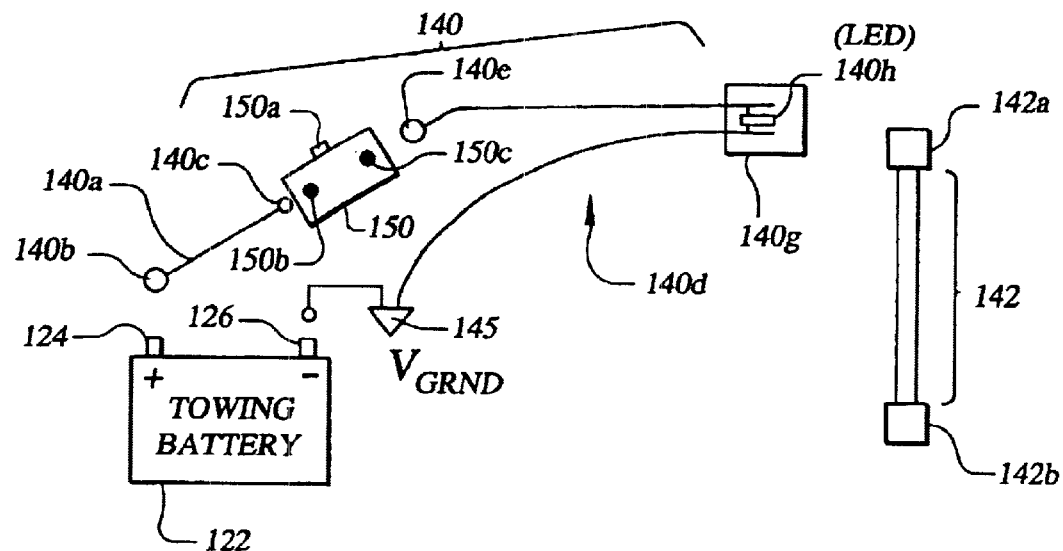
FIG. 2 is illustration of a charging assembly shown in FIG. 1 and also according to an example embodiment of the present invention.

FIGS. 1 and 2 illustrate another example embodiment of the present invention that includes the viewable indicator and the power shut-off features in a specific implementation consistent with the first example embodiment. FIG. 1 shows the overall charging arrangement between a trailered boat 110 that is towed by a towing vehicle 120, and FIG. 2 shows details of assembly articles used for implementing the arrangement.

In this example illustration, the vehicle 120 has a primary battery 122 with an anode 124 and a cathode 126 for electrically powering the vehicle 120. The boat battery 130 has an anode 132 and a cathode 134 adapted for powering the boat 110. The arrangement includes three sets of electrical lines, depicted in the figures as main lines 140, intermediary lines 142 and rear lines 144. The main lines 140 include an in-line circuit breaker 150 having a user-engageable reset 150a, a first terminal 150b and a second terminal 150c. In one application the circuit breaker 150 is implemented using a conventional type such as a Shortstop G12 (24 VDC, 30A).

The main lines 140 include a separable wire 140a with a vehicle terminal 140b at one end thereof for electrically coupling to the anode 124 of the primary battery 122 and another terminal 140c for connecting to the first terminal 150b of the in-line circuit breaker 150. For electrically coupling to the cathode 126 of the primary battery 122 through the towing vehicle ground 145, the main lines 140 also include a remaining dual-wire wire portion 140d with a vehicle terminal 140e at one end thereof and a main plug-in adapter 140g at another end thereof. The main plug-in adapter 140g includes a light indicator 140h adapted to be electrically coupled to the primary battery 122 through the main electrical lines 140 and to indicate that the main plug-in adapter 140g is electrically coupled to the primary battery 122.

Several other articles are used to complete the overall assembly. The rear electrical lines 144 includes include terminals 144a and 144b for electrically coupling to the anode and cathode of the secondary battery and including a trailered plug-in adapter 144c at another end thereof. The intermediary set of interconnecting electrical lines 142 includes a first plug-in adapter 142a at one end for releasably plugging into the main plug-in adapter 140g and electrically coupling to the primary battery 122 and a second plug-in adapter 142b at another end for releasably plugging into the trailered plug-in adapter 144c and electrically coupling to the secondary battery 130. Finally, a set of harnesses 160, such as nonconductive tie wraps, are used to secure the electrical lines. Preferably, each of the plug-in adapters is insulatively-enclosed in plastic with a female black-wire receptacle and an adjacent male red-wire receptacle for fool-proof mating.

The above articles can be sold as part of an assembly that is installed, for example, using the following procedure.

1. The three sets of electrical lines and wire harnesses are removed from the package and laid alongside the towing vehicle and equipment.

2. The rear set of rear electrical lines is connected to the equipment (second) battery. The terminals at one end of the set of electrical lines are electrically coupled to the anode and cathode of the equipment battery while the trailered plug-in adapter is positioned near the front of the trailer near the towing vehicle. The electrical lines are then connected to the trailer with the provided wire harnesses, one example being tie wraps.

3. Next, the intermediary set of interconnecting electrical lines is connected to the rear set of rear electrical lines. The plug-in adapter at one end of the intermediary set of interconnecting electrical lines is plugged into the trailered plug-in adapter thereby electrically coupling to the equipment battery. The plug-in adapter at the other end of the intermediary set of interconnecting electrical lines is positioned even to the trailer harness already on the trailer.

4. The front set of main electrical lines is connected to the intermediary set of interconnecting electrical lines and the primary battery. The plug-in adapter of the main electrical lines is connected to the second plug-in adapter of the intermediary set of interconnecting electrical lines positioned and secured even to the trailer light harness on the towing vehicle. The terminal of the ground (black) electrical line of the front set of electrical lines is securely fastened to the towing vehicle frame. The other (red, connecting at 140e of FIG. 2) electrical wire is positioned underneath toward the front of the towing vehicle. The red wire is secured to the towing vehicle with the provided wire harnesses, but not secured to any factory wiring, or near gas lines, brake lines or exhaust components.

5. The resettable circuit breaker should be permanently mounted within twelve inches of the towing vehicle's cathode battery post. The circuit breaker can not touch any metal surfaces. The terminal of the red electrical line is then coupled to one side of the circuit breaker and one of the terminals of the main electrical line (140a of FIG. 2) is coupled to the other side.

6. All connections are verified as being tight and secure. The terminal of the main electrical line is then connected to the cathode of the primary battery in the towing vehicle ensuring a secure connection.

7. Finally, verify that the light in the plug-in adapter positioned at the trailer harness is lit. If no light is visible, check and reset the circuit breaker in the engine of the towing vehicle by pushing the reset button.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: additional circuit elements, altering the types and lengths of adapters and wire harnesses. Such modifications, additions and/or changes do not depart from the true spirit and scope of the present invention that is set forth in the following claims.

What is claimed is:

1. An arrangement for charging an equipment battery for equipment while the equipment is being towed by a towing vehicle, the towing vehicle having a primary battery with an anode and a cathode for electrically powering the vehicle during use and having a rearward-located hitch at for towing the trailer that carries the equipment battery, and the equipment battery having an anode and a cathode adapted for powering the equipment, the arrangement comprising:

a front set of main electrical lines including terminals at one end thereof for electrically coupling to the anode and cathode of the primary battery and including a main plug-in adapter at another end thereof;

a rear set of rear electrical lines including terminals at one end thereof for electrically coupling to the anode and cathode of the secondary battery and including a trailered plug-in adapter at another end thereof;

an intermediary set of interconnecting electrical lines including a first plug-in adapter at one end thereof for plugging into the main plug-in adapter and electrically coupling to the primary battery and a second plug-in adapter at another end thereof for plugging into the trailered plug-in adapter and electrically coupling to the secondary battery; and an electrical continuity indicator integral with at least one of the plug-in adapters. wherein in response to the main, rear and intermediary sets of electrical lines being electrically connected, the electrical continuity indicator indicates that electric current is flowing and the primary battery charges the equipment battery.

2. The arrangement of claim 1, wherein the indicator is adapted to indicate electrical connection to the primary battery.

3. The arrangement of claim 2, wherein the indicator is adapted to generate light to indicate that the main plug-in adapter is electrically connected to the primary battery.

4. The arrangement of claim 2, wherein the indicator is a light-emitting diode electrically connected between the front set of main electrical lines.

5. The arrangement of claim 2, wherein the indicator is a light-emitting diode located within the main plug-in adapter and electrically connected between the front set of main electrical lines.

6. The arrangement of claim 1, wherein the front set of main electrical lines includes an in-line circuit breaker, and the indicator is adapted to generate light to indicate that the main plug-in adapter is electrically connected to the primary battery and is located within the main plug-in adapter and electrically connected between the front set of main electrical lines.

7. The arrangement of claim 1, wherein the front set of main electrical lines includes an in-line circuit breaker.

8. The arrangement of claim 7, wherein the circuit breaker has a first terminal and a second terminal, and the front set of main electrical lines includes a separable wire having end terminals for connecting respectively to the anode of the primary battery and the first terminal of the circuit breaker, wherein the second terminal of the circuit breaker is adapted to connect to a remaining portion of the front set of main electrical lines.

9. The arrangement of claim 1, wherein the front set of main electrical lines includes the indicator and the indicator is adapted to indicate that the main plug-in adapter is electrically connected to the primary battery, includes an in-line circuit breaker having a first terminal and a second terminal and includes a separable wire having end terminals for connecting respectively to the anode of the primary battery and the first terminal of the circuit breaker, wherein the second terminal of the circuit breaker is adapted to connect to a remaining portion of the front set of main electrical lines.

10. The arrangement of claim 9, wherein the indicator is located within the main plug-in adapter and electrically connected between the front set of main electrical lines.

11. The arrangement of claim 1, wherein the electrical continuity indicator is located adjacent to the main plug-in adapter.

12. The arrangement of claim 1, further including a circuit casing adapted to enclose at least part of the electrical continuity indictor and at least part of said at least one of the plug-in adapters.

13. The arrangement of claim 12, wherein the electrical continuity indictor is within the casing.

14. The arrangement of claim 13, wherein the electrical continuity indictor is viewable in the casing.

15. An arrangement for charging an equipment battery for equipment while the equipment is being towed by a towing vehicle, the towing vehicle having a primary battery with an anode and a cathode for electrically powering the vehicle during use and having a rearwardly-located hitch at for towing the trailer that carries the equipment battery, and the equipment battery having an anode and a cathode adapted for powering the equipment, the arrangement comprising:

an in-line circuit breaker having a first terminal and a second terminal;

a front set of main electrical lines including a separable wire with a vehicle terminal at one end thereof for electrically coupling to the anode of the primary battery and another terminal for connecting to the first terminal of the in-line circuit breaker, and a remaining dual-wire portion with a vehicle terminal at one end thereof for electrically coupling to the cathode of the primary battery through the towing vehicle and a main plug-in adapter at another end thereof, wherein the main plug-in adapter includes a light indicator adapted to be electrically coupled to the primary battery through the front set of main electrical lines and to indicate that the main plug-in adapter is electrically coupled to the primary battery;

a rear set of rear electrical lines including terminals at one end thereof for electrically coupling to the anode and cathode of the secondary battery and including a trailered plug-in adapter at another end thereof;

an intermediary set of interconnecting electrical lines including a first plug-in adapter at one end thereof for releasably plugging into the main plug-in adapter and electrically coupling to the primary battery and a second plug-in adapter at another end thereof for releasably plugging into the trailered plug-in adapter and electrically coupling to the secondary battery; and an electrical continuity indicator integral with at least one of the plug-in adapters, wherein in response to the main, rear and intermediary sets of electrical lines being electrically connected, the electrical continuity indicator indicates that electric current is flowing and the primary battery charges the equipment battery.

16. The arrangement of claim 15, further including a set of harnesses for securing the lines to the towing vehicle and trailer.

17. The arrangement of claim 16, wherein the circuit breaker includes a manually-engageable reset.

18. The arrangement of claim 15, wherein the electrical continuity indicator is located adjacent to the main plug-in adapter.

19. The arrangement of claim 15, further including a circuit casing adapted to enclose at least part of the electrical continuity indictor and at least part of said at least one of the plug-in adapters.

20. The arrangement of claim 19, wherein the electrical continuity indictor is within the casing.

21. The arrangement of claim 20, wherein the electrical continuity indictor is viewable in the casing.

22. An arrangement for charging an equipment battery for equipment while the equipment is being towed by a towing vehicle, the towing vehicle having a primary battery with an anode and a cathode for electrically powering the vehicle during use and having a rearwardly-located hitch at for towing the trailer that carries the equipment battery, and the equipment battery having an anode and a cathode adapted for powering the equipment, the arrangement comprising:

a front set of main electrical lines including terminals at one end thereof for electrically coupling to the anode and cathode of the primary battery and including a main plug-in means for releasably and electrically connecting at another end thereof;

a rear set of rear electrical lines including terminals at one end thereof for electrically coupling to the anode and cathode of the secondary battery and including a trailered plug-in means for releasably and electrically connecting at another end thereof;

an intermediary set of interconnecting electrical lines including a first plug-in means at one end thereof for releasably and electrically connecting to the main plug-in means and electrically coupling to the primary battery and a second plug-in means at another end thereof for releasably and electrically connecting to the trailered plug-in means and electrically coupling to the secondary battery; and an electrical continuity indicator integral with at least one of the plug-in means wherein in response to the main, rear and intermediary sets of electrical lines being electrically connected, the electrical continuity indicator indicates that electric current is flowing and the primary battery charges the equipment battery.

23. The arrangement of claim 22, wherein the electrical continuity indicator is located adjacent to the main plug-in means.

24. The arrangement of claim 22, further including a circuit casing adapted to enclose at least part of the electrical continuity indictor and at least part of said at least one of the plug-in means.

25. The arrangement of claim 24, wherein the electrical continuity indictor is within the casing.

26. The arrangement of claim 25, wherein the electrical continuity indictor is viewable in the casing.

* * * * *